United States Patent [19]
Althof et al.

[11] Patent Number: 5,779,446
[45] Date of Patent: Jul. 14, 1998

[54] AIR DRIVEN TURBINE INCLUDING A BLADE PITCH CONTROL SYSTEM

[75] Inventors: Jon B. Althof, Loves Park; Shan-Chin Tsai, Rockford; Teddy L. Jones, Cherry Valley, all of Ill.

[73] Assignee: Sundstrand Corporation, Rockford, Ill.

[21] Appl. No.: 553,180

[22] Filed: Nov. 7, 1995

[51] Int. Cl.⁶ ........................................ F01D 7/02
[52] U.S. Cl. ................ 416/36; 416/30; 416/35; 416/47; 416/49; 416/50; 416/51; 416/162; 416/165
[58] Field of Search .................. 416/35, 36, 44, 416/46, 47, 49, 50, 51, 52, 25, 27, 30, 162, 165, 167, 168 R, 168 A; 364/431.01, 431.02

[56] References Cited

U.S. PATENT DOCUMENTS

| | | |
|---|---|---|
| 1,747,230 | 2/1930 | Duprey . |
| 2,327,274 | 8/1943 | Levine . |
| 2,370,135 | 2/1945 | Berliner . |
| 2,370,167 | 2/1945 | Hoover et al. . |
| 2,874,787 | 2/1959 | Battenberg et al. . |
| 3,900,274 | 8/1975 | Johnston et al. . |
| 4,584,486 | 4/1986 | Quynn .................................. 416/44 |
| 4,656,362 | 4/1987 | Harner et al. ....................... 416/44 |
| 4,692,093 | 9/1987 | Safarik . |
| 5,199,850 | 4/1993 | Carvalho et al. .................. 416/162 |

*Primary Examiner*—Christopher Verdier
*Attorney, Agent, or Firm*—Lawrence E. Crowe

[57] ABSTRACT

An air driven turbine having variable pitched blades is provided that includes a pitch change mechanism and associated control circuits for automatically adjusting the pitch of the blades during either rotating or non-rotating operational modes of the air driven turbine. The pitch control mechanism includes a resettable overspeed protection device which is directly actuated by an overspeed condition of the turbine and operates independently from the pitch change mechanism to move the blades to a failsafe, feathered, or coarse pitch, low speed position. The pitch control mechanism utilizes a linear actuator in the form of an acme screw drive. The air driven turbine includes a ball ramp thrust bearing for attaching the blades to a hub of the turbine in such a manner that during rotation of the turbine actuation loads on the pitch change mechanism are reduced. The control circuits utilize simple on-off switching circuits for controlling blade pitch, thereby eliminating the need for more complex PID type control functions.

19 Claims, 9 Drawing Sheets

$$F_{act} = \frac{(T_{br} - T_{ctm} - T_{atm}) \times N}{R \times \cos \emptyset_y}$$

$$F_{act} = \frac{(T_{br} - T_{ctm} - T_{atm}) \times N}{R \times \cos \varnothing_y}$$

AIR DRIVEN TURBINE INCLUDING A BLADE PITCH CONTROL SYSTEM

TECHNICAL FIELD

Our invention relates to air driven turbines of the type utilized for: extracting energy from air flowing about an aircraft in flight; reducing lift-induced drag on the aircraft; and dissipating vortices emanating from the aircraft. More particularly, our invention relates to a pitch changing mechanism for controlling the pitch of a blade of such air driven turbines during both rotating and non-rotating modes of operation of the turbine.

BACKGROUND

Air driven turbines are currently utilized on aircraft for extracting energy from air flowing about an aircraft in flight to provide power for auxiliary or emergency power generating devices carried by the aircraft. Typically, the air driven turbine includes a hub mounted on the aircraft for rotation about an axis of rotation. One or more blades are attached to the hub to cause rotation thereof when an airstream is directed across the blades.

In current aircraft, the airstream directed across the blades is typically created by free air, commonly known as "ram air", flowing past the aircraft while it is in flight. Ram air is created by forward motion of the aircraft along a flightpath. Air driven turbines that extract power from ram air are commonly known as "ram air turbines", or "RATs". RATs have been utilized on aircraft for many years for driving electrical generators, or hydraulic pumps, which provide a source of emergency power to certain flight-critical aircraft systems during in-flight situations where main engine power has been lost. RATs have also been utilized for powering pod mounted equipment, including refueling or avionics pods.

In the future, air driven turbines known as "vortex turbines" will also be utilized to extract energy from swirling vortices of air emanating from an aircraft in flight. These vortices are a by-product of creating lift in the wings, etc. of the aircraft. Airflow in a vortex is distinguished from ram air flow by the direction of flow. Ram air flows in a direction essentially counter-parallel to the direction of flight. Vortex flow forms an essentially helical, spiraling air flow extending behind the aircraft about a vertical axis which is generally parallel to the direction of flight. For a large commercial aircraft, a vortex emanating from one of the wingtips can have a strength of several hundred horsepower. The energy in the vortex represents a drag loss on the aircraft. The vortex also presents a significant threat of loss of control for small aircraft passing through the vortex, even at distances of several miles behind the aircraft creating the vortex. U.S. Pat. Nos. 4,917,332 to Patterson, and 5,150,859 to Ransick describe vortex turbines for extracting power from vortices generated at aircraft wingtips to reduce drag and provide power for on-board systems of the aircraft.

Air driven turbines on future aircraft will likely be designed to extract energy from a combination of ram air and vortex air flow. Regardless of the source of the air flow, both current and future air driven turbines will in many instances utilize variable pitch blades for controlling rotational speed or power output of the turbine.

In prior RATs, a flyball governor driven pitch control system was often utilized for adjusting blade pitch to maintain the rotational speed of the turbine at a constant value regardless of the flight speed of the aircraft. This was done where the turbine drove an electrical generator in order to ensure that the generator would produce power at a constant frequency, of 400 HZ for example. The flyball governor of a typical prior RAT utilized a mechanical governor with large springs and counterweights to automatically control speed. U.S. Pat. Nos. 5,257,907 to Seidel and 4,411,596 to Chilman are illustrative of this approach.

Vortex turbines are sometimes operated in a non-rotating mode, however, i.e. with the hub locked against rotation, for vortex dissipation and drag reduction only. In such a dissipation or drag reduction mode, it is desirable to adjust the pitch of the blades as a function of airspeed to maximize dissipation and drag reduction. Therefore, vortex turbines operating in a non-rotating mode require a pitch changing mechanism which can control blade pitch independent of the rotational speed of the turbine. The mechanical, spring driven, flyball governor pitch control systems utilized in the past for RATs are thus not applicable in some instances for vortex turbines, or for future air driven turbines which function as both RATs and vortex turbines. What is needed, then, is a pitch control system that is capable of adjusting blade pitch during both rotating and non-rotating mode of operation of the turbine.

Flyball governor/spring driven pitch change systems of the type used in current aircraft mounted air driven turbines are typically limited by their construction to governing speed to a constant, predetermined value. While these flyball type governors have generally worked satisfactorily for such constant speed applications, they have proved to be inadequate, under some circumstances, for preventing "droop" in an output power parameter, such as voltage or hydraulic pressure respectively, of a generator or pump driven by the turbine, when demands for electrical current or fluid flow respectively approached or exceeded the maximum rated output capacity of the generator or pump. This droop occurs because the amount of power which can be extracted from a given airstream by a given air driven turbine is highly dependent upon the rotational speed of the turbine. For a turbine in which blade pitch is adjusted solely as a function of speed, rather than as a function of the output power being demanded from the driven device, the turbine will be incapable of responding to demands for power delivery requiring turbine speeds above the governed speed value. Under such conditions, one or more output power parameters will droop because the power output demanded exceeds that which can be provided at the governed speed. To compensate for this propensity to droop, prior air driven turbines having flyball-type governors were often oversized, thereby imposing undesirable weight penalties on the aircraft which carried them. The desired pitch control system should thus be capable of eliminating or significantly reducing such "droop" in output voltage or fluid pressure.

In some RATs and rotating vortex turbines a fail-safe overspeed protection mechanism is also required to limit maximum operating speed of the turbine, in order to prevent destructive overload conditions on the blades, etc., should the pitch control system fail. One commonly used approach to solving this problem is to provide a mechanism for forcing the blades to a feathered, or coarse pitch, (low speed) position, should an overspeed condition occur. U.S. Pat. Nos. 4,578,019 to Safarick and 4,671,737 to Whitehouse illustrate prior approaches to providing pitch control systems including such overspeed protection mechanisms.

Safarick utilizes a motor driven pitch control system, including a reference shaft driven at constant speed, to provide both the pitch change and overspeed control functions. Since the overspeed protection function is not operable independently from the pitch change mechanism, however, a single failure anywhere in the pitch control system of Safarick can also result in loss of the overspeed protection function.

Whitehouse uses a motor driven pitch control system coupled with a spring driven, solenoid activated, overspeed mechanism for disengaging the pitch change mechanism and driving the blades to a fail-safe position. The solenoid is activated by an external control loop which senses an overspeed condition and activates the solenoid. Although the overspeed protection device functions essentially independently from the pitch change mechanism, the need for providing an external control loop operating indirectly to decouple the pitch change device and feather the blades creates a risk of overspeed should the external control loop fail to operate.

Air driven turbines of the type used as RATs and/or vortex turbines on aircraft typically are designed to rotate at speeds of several thousand rpm. The desired pitch control system must, therefore, be of robust construction to withstand the high centrifugally generated forces incident with such high speed operation. Prior pitch control systems directed toward aircraft propellers or windmills, which rotate at only a few hundred rpm, are generally not suitable for use in air driven turbines of the type described above.

Accordingly, it is an object of our invention to provide an air driven turbine or other bladed device including an improved pitch control system. Other objects of our invention include providing:

1) a pitch change system which is capable of controlling blade pitch during both rotating and non-rotating modes of operation of the turbine;

2) a pitch control system capable of preventing "droop" in an output power parameter of a power producing driven device operably coupled to the air driven turbine to be driven thereby;

3) a pitch control system which is adaptable to control speed of the turbine at a constant predetermined value;

4) a pitch control system which is adaptable for varying the speed of the turbine to control the power output of the turbine or a device driven thereby;

5) a pitch control system as above in which the overspeed protection mechanism functions independently from the pitch control function;

6) a pitch control system as above which is adaptable to turbines which do not rotate;

7) an overspeed protection device of straightforward construction and operation which is compatible with a wide variety of pitch change systems including those which use spring driven flyball governor actuators, and those which use electric or fluid motor driven pitch change actuators;

8) an air driven turbine as above which is operable as either a RAT or a vortex turbine;

9) an overspeed protection device which is readily resettable after preventing an overspeed condition;

10) an air driven turbine with adjustable pitch blades as described above of straightforward, robust, design which can be readily manufactured at low cost and weight, and which provides enhanced reliability; and 11) an aircraft including an improved air driven turbine operably connected for driving a device for producing a power output in such a manner that the power output does not "droop" as in prior air driven turbines.

SUMMARY

Our invention provides a bladed device having variable pitch blades that satisfies the objects above through the use of: (1) a pitch control system that couples a simple on-off type automatic control to a non-backdrivable linear actuator; and (2) a resettable overspeed protection device, which is directly actuated by an overspeed condition of the bladed device, and which operates independently from the pitch change mechanism to move the blades to a failsafe, feathered, or coarse pitch, low speed position. The pitch control system and the overspeed protection device of our invention are readily applicable to a variety of pitch change mechanisms suitable for use in both rotating and non-rotating air driven turbines. The pitch control system of our invention provides stable control of blade pitch in both constant speed and variable speed applications, without resorting to complex control mechanisms. The overspeed device of our invention is readily resettable during servicing of the bladed device subsequent to the overspeed condition.

Specifically, according to a first aspect of our invention, a blade pitch control system is provided for a bladed device having a hub defining an axis of the hub and one or more movable blades extending from the hub along a blade pitch axis passing transversely through the hub. The blades are attached to the hub for rotation of the blade about the blade pitch axis through a range of blade pitches of the blade with respect to the axis of the hub. The blade pitch control system includes pitch change actuator means operably connected between the hub and the blade for changing the blade pitch of the blade with respect to the hub. The pitch change actuator includes a motor, a non-backdrivable drive means having an input connected to the motor to be driven thereby, and an output connected to the blade for changing the pitch of the blade when the drive means is driven by the motor. The blade pitch control system also includes means for sensing a blade pitch of the blade with respect to the hub and providing first position signals indicative of that blade pitch. A source of second position signals indicating a desired blade pitch is also provided. The blade pitch control system further includes means for creating a blade pitch position error signal from the first and second blade pitch position signals, and means for applying pitch control signals to the motor which are a function of the blade pitch position error signal.

In a preferred embodiment of a blade pitch control system according to the first aspect of our invention, the means for applying pitch control signals includes comparator means for comparing the blade pitch position error signal to a predetermined threshold value of the blade pitch position error signal. Motor drive means are operably connected to the motor for supplying the control signals thereto. Switching means are operably connected between the comparator and the motor drive for enabling the motor drive to supply the pitch control signals to the motor when the blade pitch position error signal exceeds the threshold value, and for inhibiting the motor drive means from supplying the pitch control signals to the motor when the blade pitch position error signal does not exceed the threshold value.

According to a second aspect of our invention, a blade pitch control system is provided for a bladed device having a hub that is rotatable about an axis of rotation of the hub, and a movable blade extending from the hub along a blade pitch axis passing transversely through the hub. The blade is attached to the hub for rotation of the blade about the blade pitch axis through a range of blade pitches of the blade with respect to the axis of rotation of the hub. The blade pitch control system includes pitch change actuator means operably connected between the hub and the blade for changing the blade pitch of the blade with respect to the hub. The pitch change actuator includes a motor, a non-backdrivable drive means having an input connected to the motor to be driven thereby, and an output connected to the blade for changing the pitch of the blade when the drive means are driven by the motor. Means are provided for sensing a rotational speed of the hub about the axis of rotation and providing first speed signals indicative of that rotational speed. A source of second speed signals indicating a desired rotational speed of the hub is also provided. The blade pitch control system further includes means for taking the derivative of the first speed signal to determine actual acceleration of the hub and generating an acceleration signal indicative of that actual acceleration. Means are provided for creating a blade pitch position error signal from the first and second speed signals and the acceleration signal. Means are also provided for applying pitch control signals to the motor which are a function of the blade pitch position error signals.

A preferred embodiment according to the second aspect of our invention also includes a comparator means, motor drive means, and switching means, as previously described above with reference to the first aspect of our invention.

According to a third aspect of our invention, a pitch control system that is capable of controlling blade pitch in both a rotating and a non-rotating operational mode of a bladed device is provided by combining various elements and features of the first and second aspects of our invention described above. Specifically, a blade pitch control system is provided for a bladed device having a hub that is rotatable about an axis of rotation of the hub and includes a movable blade extending from the hub along a blade pitch axis passing transversely through the hub, with the blade being attached to the hub for rotation of the blade about the blade pitch axis through a range of blade pitches of the blade with respect to the axis of rotation of the hub. The blade pitch control system according to this aspect of our invention includes pitch change actuator means operably connected between the hub and the blade for changing the pitch of the blade with respect to the hub. The blade pitch change actuator includes a motor, a non-backdrivable drive means having an input connected to the motor to be driven thereby, and an output connected to the blade for changing the pitch of the blade when the drive means is driven by the motor. First control means are provided for controlling the pitch of the blades when the bladed device is not rotating about the axis of rotation, and second control means are provided for controlling the blade pitch of the blade when the bladed device is rotating about the axis of rotation.

By providing separate means for controlling the blades in the rotating and non-rotating modes two significant operational advantages are provided. First, the threshold values can be different for the rotating and non-rotating modes. For example, in a non-rotating mode it may be sufficient to control blade pitch within a tolerance band of about plus or minus 5 degrees of a desired pitch angle and still achieve essentially optimum drag reduction or vortex dissipation with improved control response time. In a rotating mode, however, it may be desirable to control blade pitch to a significantly smaller tolerance band of about plus or minus 0.2 degrees in order to achieve a desired speed or output parameter, such as constant frequency, of a power output of a power producing device driven by the turbine. Second, the means for controlling blade pitch during a non-rotating mode can be configured to also be selectively operable during the rotating mode as a backup or failsafe means for controlling blade pitch should the normal means for controlling pitch of the blades during rotating operation become inoperative.

According to another aspect of our invention, an aircraft is provided which includes an air driven turbine attached to the aircraft and disposed to extend into an airstream flowing about the aircraft. The air driven turbine includes a hub rotatable about an axis of rotation of the hub and a movable blade extending from the hub along a blade pitch axis passing transversely through the hub. The blade is attached to the hub for rotation of the blade about the blade pitch axis through a range of blade pitches of the blade with respect to the axis of rotation of the hub. A power generating device is operably connected to the hub to be driven thereby for producing a power output of the power generating device. A pitch control system is provided for controlling the blade pitch as a function of the power output of the power generating device, rather than as a function of the rotational speed of the air driven turbine as was the case in prior air driven turbines using flyball governor type pitch control systems to maintain turbine rotation at a constant speed. The pitch control system, according to this aspect of our invention includes means for sensing the power output of the generating device and providing a first power output signal indicative of that output. A source of second power output signals indicating a desired power output of the power generating device is also provided. Means are further provided for controlling the power output of the power generating device by controlling the pitch of the blade as a function of the first and second power output signals. By allowing speed to be controlled as a function of output power, the problem of "droop" in a parameter of the output power experienced in prior air driven turbine driven power systems is eliminated without resorting to oversizing the air driven turbine, thereby providing significant benefit to the aircraft by reducing the weight of the turbine.

According to a preferred embodiment of an aircraft according to our invention, the pitch control system includes means for sensing a rotational speed of the hub about the axis of rotation and providing first speed signals indicative of that rotational speed. Means are provided for sensing the power output of the power generating device and providing second speed signals indicating a desired power output of the power generating device. The pitch control system also includes means for controlling the power output of the power generating device by controlling the pitch of the blade as a function of the first and second speed signals.

A preferred embodiment of a pitch change actuator according to our invention utilizes a linear actuator operably coupled through the overspeed protection device to adjust blade pitch at normal operating speeds of the turbine. Should the turbine exceed a predetermined maximum acceptable speed, a flyball operated trigger mechanism within the overspeed device automatically disconnects the linear actuator from the blade, and an independent return spring drives the blades to a failsafe condition.

According to one preferred embodiment of our invention, the non-backdrivable drive means of the pitch change actuator is provided by a linear actuator which includes an irreversible acme screw drive. The irreversible acme screw drive provides an additional safety feature, in that should the pitch control system of our invention fail, the blades will remain in the last commanded position rather than being free to rotate about the pitch axis under the influence of an air stream passing through the blades. Furthermore, the acme screw drive inherently provides a significant amount of damping which is utilized to advantage in the pitch change control system, thereby allowing the pitch control system to be less complex than former pitch control systems which use other types of drives, such as ball screws, that require additional brake elements or control complexity in order to achieve sufficient position holding capability and stable control.

In a highly preferred embodiment of our invention, ball ramp bearing means are provided for operably attaching the blades to the hub of the air driven turbine in such a manner that centrifugally generated forces acting on the blades during rotation of the hub operate to aid the pitch change mechanism in adjusting the blade pitch of the blades, thereby reducing the actuation load on the pitch change actuator mechanism and the overspeed protection device. By reducing the actuation load on the pitch change actuator mechanism, the various components and elements of the pitch change actuator may be made physically smaller and lighter than they would otherwise have to be. Reducing the actuation load also tends to enhance performance of the pitch change system by reducing response time.

Other objects, advantages and novel features of our invention will be readily apparent upon consideration of the following drawings and detailed descriptions of preferred embodiments.

DESCRIPTION OF THE INVENTION

Figure 1:
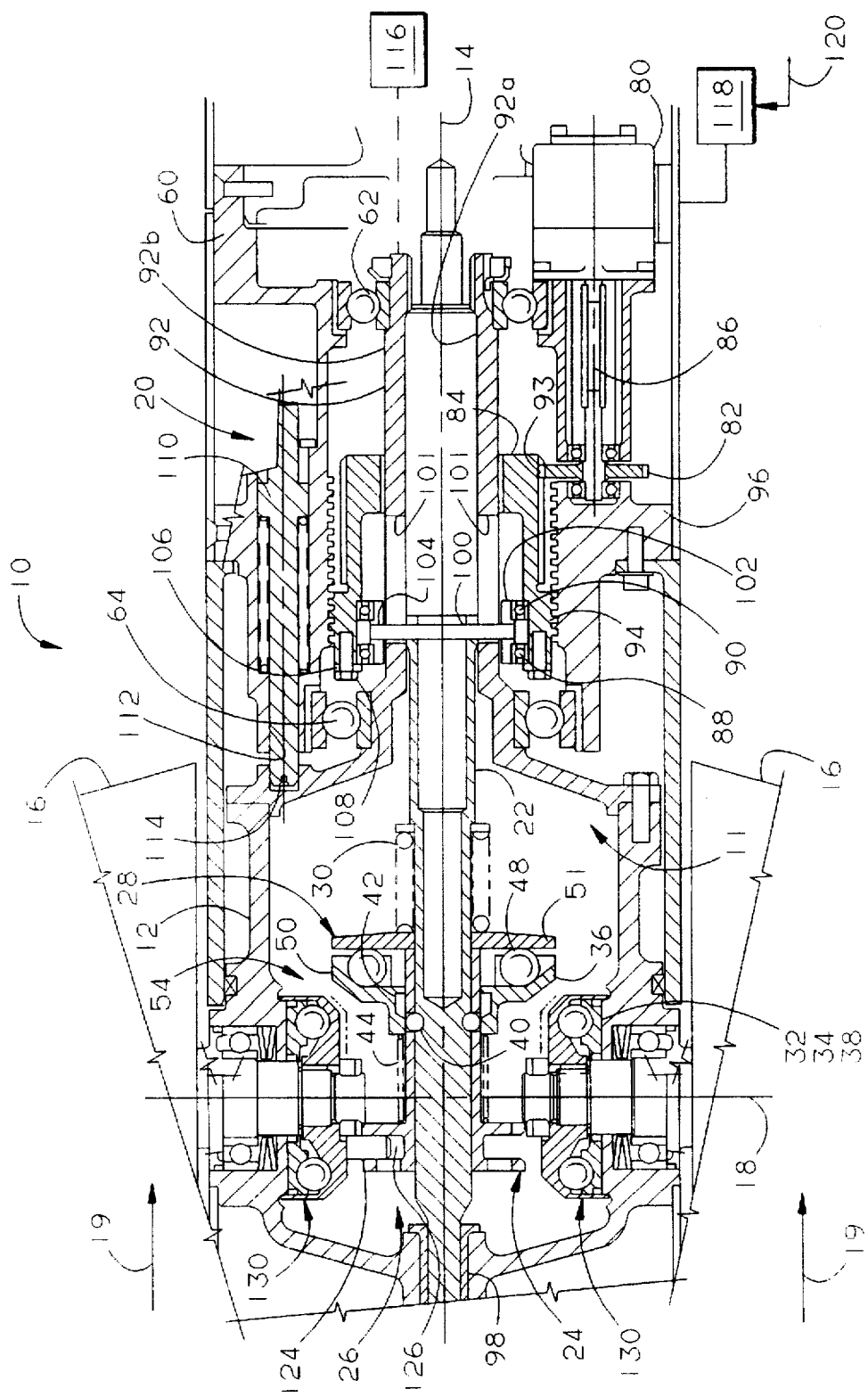
FIG. 1 is a cross-sectional illustration of an air driven turbine in the form of a vortex turbine according to our invention.
Figure 2:
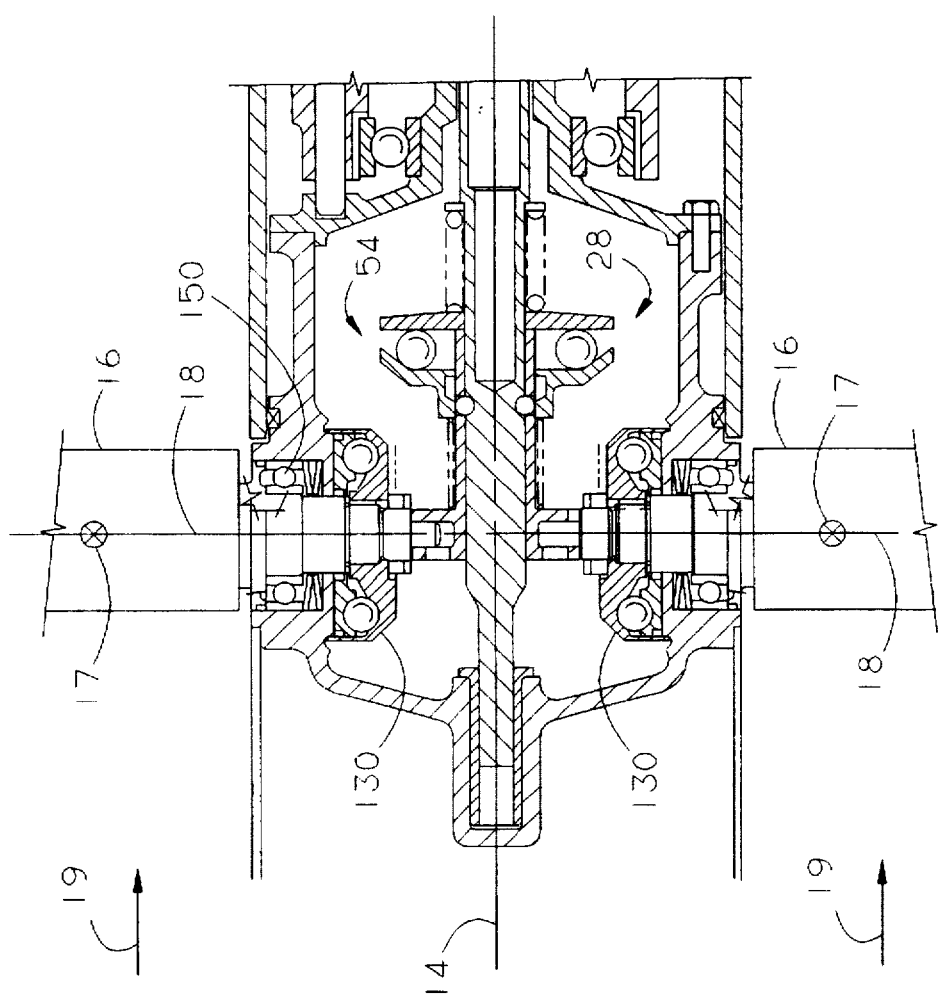
FIGS. 2-3 depict an overspeed mechanism of the vortex turbine of FIG. 1 in a normal operating position and a failsafe position respectively.
Figure 3:
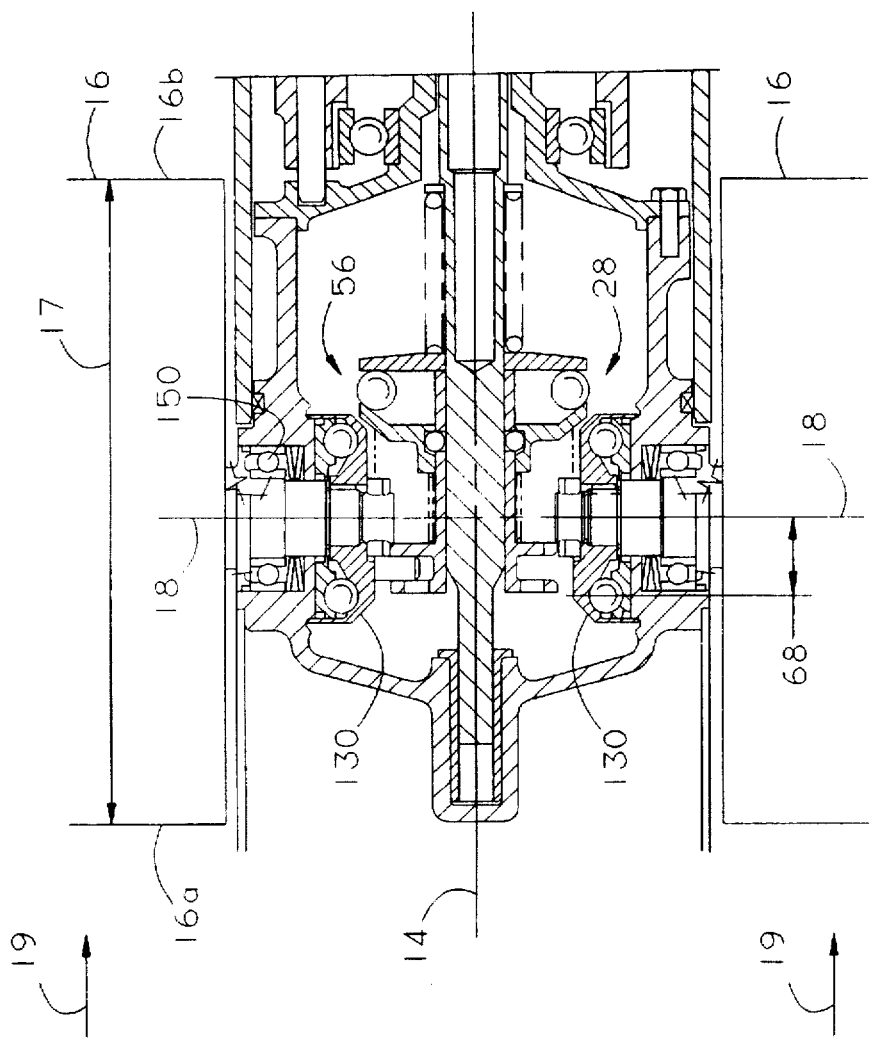

FIGS. 1-8 illustrate a bladed device in the form of an air driven vortex turbine 10 and a pitch change system 11 according to our invention. The vortex turbine 10 includes a hub 12 mounted in bearings 62, 64 for rotation about an axis of rotation 14. The bearings 62, 64 are supported by a support structure 60 in the form of a strut or pod, etc., attached to an aircraft. A pair of blades 16 extend radially from the hub 12 along a blade pitch axis 18. The blades 16 are attached to the hub 12 in a manner allowing the blades 16 to be rotated about the pitch axis 18 through a range of blade pitches, including a failsafe position. For vortex turbines, or for RATs, this failsafe position is generally referred to as a coarse pitch, or feathered position of the blades 16. FIGS. 1 and 3 illustrate the blades 16 in the coarse pitch or feathered position. When the blades 16 are feathered, they are positioned, as best seen in FIG. 3, such that a chordal axis 17 of the blades 16, extending from a leading edge 16a to a trailing edge 16b of the blade 16 is preferably aligned more parallel than not to the axis of rotation 14. In this position, a flow of air 19 passing over the blades 16 from the leading to the trailing edges 16a, 16b thereof will create minimal lift on the blades 16, thereby causing low speed rotation of the hub 12.

FIG. 2 illustrates the blades 16 in a normal operating position, also known as fine pitch, corresponding to normal rotational speeds of the hub 12 below a predetermined maximum operating speed of the hub 12. At such normal speeds, the blades 16 are positioned such that the chordal axis 17 of the blades 16 is more transverse, or perpendicular, than not with respect to the axis of rotation 14. As illustrated in FIG. 2, the chordal axis 17 will thus extend into and out of the plane of the figure at a more acute angle during normal operation than when the blade is in the failsafe position illustrated in FIGS. 1 and 3.

As shown in FIG. 1, the blade pitch control system 11 includes a pitch change linear actuator 20 having an axially extendable shaft 22, extending therefrom, and disposed for axial movement along the axis of rotation 14. The pitch change actuator of the exemplary embodiment includes an electric motor 80 which is operably connected via a geartrain (not shown) internal to the motor 80 and a drive gear 82 to drive a translating acme nut 84 which is operably connected to the shaft 22 for causing axial movement of the shaft 22 when the acme nut 84 is driven by the electric motor 80. Specifically, the electric motor 80 and drive gear 82 are mounted to the support structure 60 in a manner which does not allow either the motor 80 or the drive gear 82 to translate along the axis 84. The motor 80 and drive gear 82 are further disposed so that motor 80 can rotate the drive gear 82 about a drive gear axis 86 oriented generally parallel to the axis of rotation 14. The acme nut 84 is disposed about and supported by bearings 88, 90 mounted on a hollow portion 92 of the hub 12 extending between the hub support bearings 62, 64. A driven gear portion 93 of the acme nut 84 operably engages the drive gear 82 in a gearmesh relationship such that rotation of the drive gear 82 by the motor 80 will cause the acme nut 84 to rotate simultaneously about the hollow portion 92 of the hub 12 and the axis of rotation 14. The acme nut 84 also includes a threaded portion 94 which operably engages a mating, non-rotating, axially stationary, acme screw portion 96 of the support structure 60 in such a manner that as the acme nut 84 rotates about the axis 14, the engagement of the threaded portion 94 of the acme nut 84 with the acme screw portion 96 of the support structure 60 will cause the acme nut 84 to translate axially with respect to the hub 12 and support structure 60.

The acme screw portion and nut 96,84 cooperate to form a non-backdrivable acme screw drive means. As used herein the term "non-backdrivable drive means" includes acme screws, worm gear drives, crossed helical gear drives, or any other type of drive having a significantly higher drive efficiency in a forward direction from an input to an output of the drive than in the reverse direction. By judicious design of the cooperating elements of such drives, the drive becomes essentially non-backdrivable in that although the output may be easily repositioned when driven in the forward direction, loads applied to the output are incapable of rotating the input of the drive. Such drives thus provide particular advantage in the practice of our invention by virtue of the fact that they provide an inherent position holding capability, as well as inherent isolation of the motor 80 from inertial and aerodynamic loads imposed by the blades 16. Non-backdrivable drive means provide yet a further advantage in a pitch control system according to our invention by virtue of the inherently high damping provided by such devices which is utilized opportunistically in our invention to reduce the complexity of the control system.

The shaft 22 extends through the hollow portion 92 of the hub 12, and is slidingly supported for axial motion with respect to the hub 12 by an inner wall 92a of the hollow portion 92 and a shaft bearing 98 supported by the hub 12. The shaft 22 is restrained to rotate with the hub 12 by a pin 100 extending transversely through the shaft 22 and engaging a pair of axially elongated slots 101 in the hollow portion 92 of the hub 12. The elongated slots 101 are configured to closely abut the pin 100 in a manner that prevents relative rotation between the shaft 22 and the hub 12, but allows the shaft 22 to translate axially with respect to the hub 12.

Each end of the pin 100 also engages a hole 104 in bearing carrier means 102 disposed about the hollow portion 92 of the hub 12 for supporting the radially inner races of the acme nut bearings 88, 90. The bearing carrier means 102 is configured to slide axially along an outer surface 92b of the hollow portion 92 of the hub 12.

Acme nut bearing retainer means in the form of a retainer washer 106 and screws 108 constrain the outer races of the acme nut bearings 88, 90 within the acme nut 84 in such a manner that axial motion of the acme nut 84 is transferred to the shaft 22 via the acme nut bearings, the bearing carrier and retainer means 102, 106, 108, and the pin 100, to thereby cause the shaft 22 to move axially, with respect to the hub 12 and support structure 60, in unison with the shaft 22.

A retractable locking pin 110 is provided for selectively preventing rotation of the hub 12 with respect to the support structure 60. The locking pin 110 slides axially within a bore 112 of the support structure 60 to engage a locking recess 114 in the hub 12.

The blade pitch control system 11 further includes, a yoke 24 slidably mounted for axial movement on the shaft 22. Eccentric arm means 26 operably couple the yoke 24 to the blades 16 in such a manner that axial movement of the yoke 24 causes the blades 16 to rotate about the blade pitch axis 18, thereby changing the pitch of the blades 16 with respect to the axis of rotation 14. As used herein, the terms "pitch of the blades", or "blade pitch", or their equivalents refer to an angle of the chordal axis 17 of the blade 16 with respect to the axis of rotation 14 when viewed through a plane extending generally perpendicularly to the blade pitch axis 18 and containing the chordal axis 17.

In the exemplary embodiment of FIGS. 1–9c, the eccentric arm means 26 includes an eccentric pin 124 which engages an annular groove 126 in the yoke 24. The eccentric pin 124 is attached to the blades 16 at a point radially eccentric from the blade pitch axis 18 in such a manner that as the yoke 24 moves axially, the interaction of the annular groove 126 with the eccentric pin 124 will cause the blades 16 to rotate about the blade pitch axis 18 toward the desired blade pitch. Both of the blades 16 illustrated in the exemplary embodiment operably engage the annular groove 126 in similar fashion so that the blade pitches of both blades 16 are adjusted in unison. Although only two blades 16 are illustrated in FIGS. 1–9b, it will be readily apparent that pitch change systems 203,11 according to our invention are also applicable to air driven turbines having fewer or more than two blades 16.

As shown in FIGS. 1 and 2, the yoke 24 is operably coupled to the shaft 22 by resettable, speed responsive, disconnect means 28, in such a manner that below a predetermined disconnect speed of the hub 12, the yoke 24 is constrained to move axially in unison with the shaft 22. Above the disconnect speed, the speed responsive disconnect means 28 actuates and decouples the yoke 24 from the shaft 22 as shown in FIG. 3. The yoke 24 is then free to move axially along the rotational axis 14 independently from the shaft 22. A return spring 30 is provided for urging the yoke 24 toward a failsafe position of the yoke 24 along the rotational axis 14, as indicated at 68 in FIG. 3, when the yoke 24 is decoupled from the shaft 22, thereby driving the blade 16 to the failsafe, coarse pitch position shown in FIG. 3.

The resettable speed responsive disconnect means 28 includes a plurality of detent balls 32 for locking the yoke 24 and shaft 22 together. The shaft 22 includes detent means 34 for receipt and axial retention therein of the detent balls 32. The yoke 24 includes through-holes 38 for receipt and axial retention therein, or passage therethrough of the detent balls 32.

The resettable disconnect means 28 also includes a locking piston 36 disposed for axial movement along the yoke 24 between a locked position 54, as shown in FIGS. 1 and 2, and an unlocked axial position 56, as shown in FIG. 3. The locking piston 36 includes a first surface 40 thereof for retaining the detent balls 32 simultaneously within the through-holes 38 and the detent means 34 when the locking piston is in the locked position, thereby locking the yoke 24 and shaft 22 together such that they move axially in unison. The piston 36 further includes a second surface thereof forming a second detent means 42 for receipt of the detent balls 32 when the locking piston 36 is moved axially to the unlocked position 56.

Figure 4:
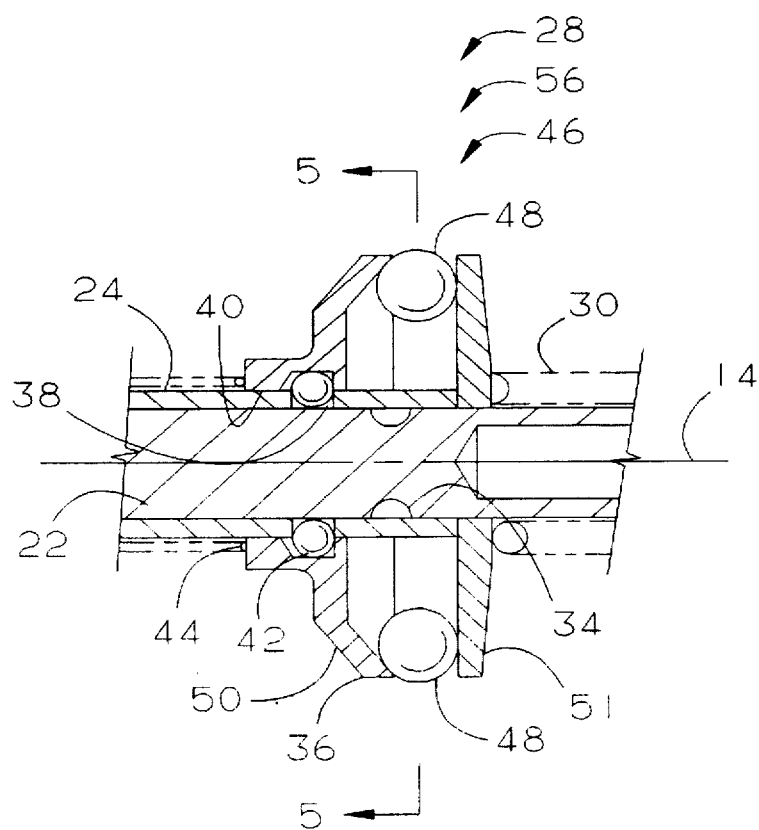
FIGS. 4-5 illustrate various features of the overspeed protection mechanism illustrated in the vortex turbine of FIGS. 1-3.

The first and second detent means 34, 42, the detent balls 32, and the throughholes 38 are compatibly designed such that when the locking piston 36 is in the unlocked position 56, the detent balls 32 will pass through the through-holes 38 into the second detent means 42, as shown in FIG. 4, and fully disengage from the first detent means 34, such that the yoke 24 is free to move axially with respect to the shaft 22. A governor spring 44 is operably connected between the yoke 24 and the locking piston 36 in a manner biasing the locking piston 36 toward the locked position 54.

Figure 5:
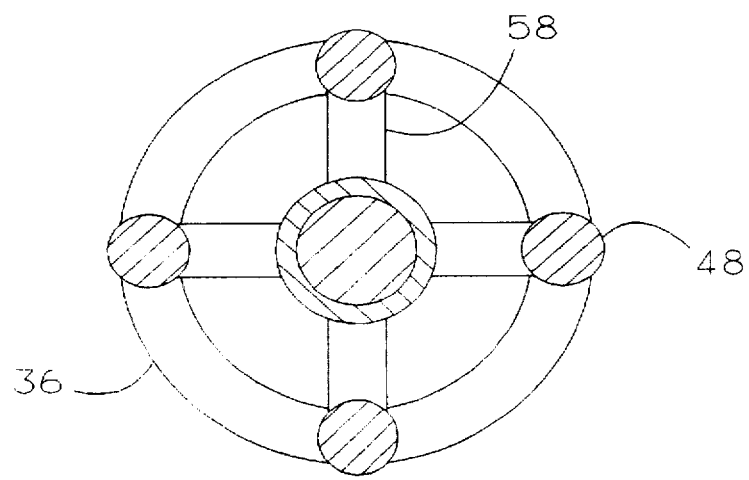

As shown in FIGS. 4 and 5, flyball governor means, generally designated 46, are operably connected between the yoke 24 and the locking piston 36 for urging the locking piston 36 to move from the locked to the unlocked position 54, 56 when the disconnect speed is achieved. The flyball governor means 46 includes a plurality of flyballs 48 disposed in a circular array about the axis of rotation 14 between a first and a second reaction plate 50, 51. The first reaction plate 50 is integrally attached to the locking piston 36. The second reaction plate axially preloaded against the yoke 24 by a return spring 30. The first and second reaction plates 50, 51 define juxtaposed radially directed ball ramp means, including ball grooves 58 for receipt therein of the flyballs 48. The ball grooves 58 are configured such that as the flyballs 48 move radially outward due to centrifugal force caused by rotation of the hub 12, the flyballs 48 overcome the force of the governor spring 44 and cause the first reaction plate 50 to move axially away from the second reaction plate 51.

The reaction plates 50, 51 flyballs 48 and governor spring 44 are compatibly designed such that at the predetermined rotational speed of the hub 12, the flyball governor means 46 will move the locking piston 36 from the locked to the unlocked axial positions 54, 56. The detent balls 32 then decouple the yoke 24 from the shaft 22. The return spring 30 then drives the yoke 24 to the left as illustrated in FIGS. 1–4, and the yoke 24 in turn drives the blades 16 to the failsafe pitch position illustrated in FIG. 3.

Figure 9A:
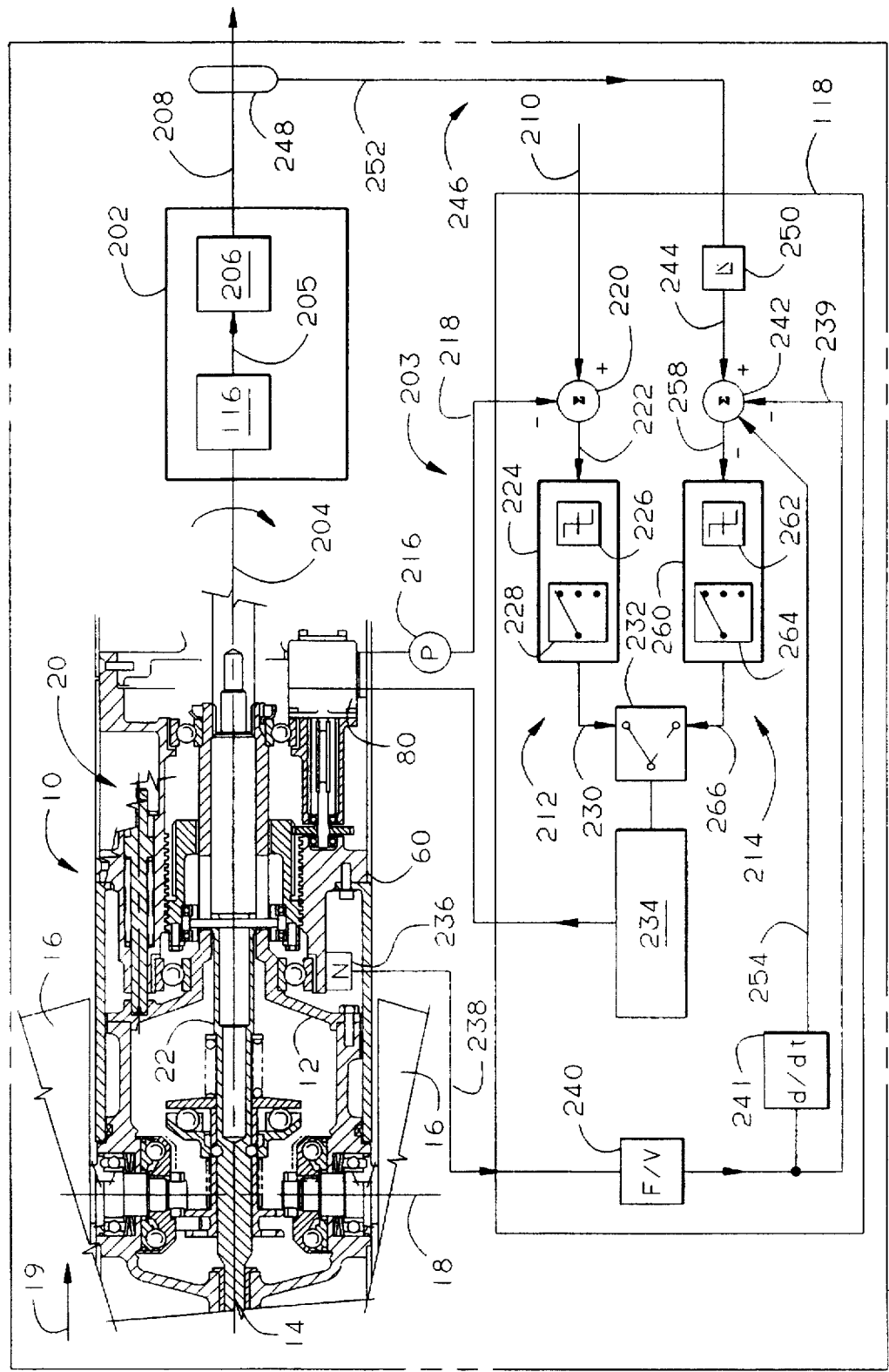
FIGS. 9a-c illustrate an aircraft including an air driven turbine and first, second and third exemplary embodiments of a pitch control system according to our invention.

FIG. 9a illustrates an embodiment of our invention in the form of an aircraft 200 having an air driven turbine 10 as described above attached to the aircraft 200 and disposed to extend into the airstream 19 flowing about the aircraft 200. The aircraft 200 includes a power generating device 202 which is operably connected by drive means 204 to the hub 12 of the air driven turbine 10 to receive shaft power therefrom. The power generating device 202 includes a driven device 116 in the form of an electrical generator which is directly coupled to the drive means 204 to receive the shaft power from the air driven turbine 10. The generator 116 converts shaft power received from the drive means 204 into an electrical output 205 of the generator 116. The power generating device 202 further includes a converter 206 which receives the electrical output 205 from the generator 116 and converts the electrical output 205 into a power output 208 of the power generating device 202. For the embodiment of our invention depicted in FIG. 9a, the generator 116 produces an alternating current output 205. Because the drive means 204 may rotate at variable speed, the output 205 of the generator 116 will have a variable frequency proportional to a rotational speed of the turbine 10 and the drive means 204. The converter 206 converts the variable frequency alternating current input 205 into a constant frequency power output signal 208, at a frequency of 400 hertz for example. The generator 116 may be a permanent magnetic generator, a brushless alternator, or virtually any other type of generator known in the art. Similarly, the converter 206 may be a dc link VSCF type converter, or a wide variety of other configurations known in the art.

The aircraft 200 further includes a pitch control system, generally indicated as referenced numeral 203, including means that are capable of controlling the pitch of the blades 16 of the air driven turbine 10 during both a rotating and a non-rotating node of operating the air driven turbine 10. The pitch control system 203 includes a controller 118 and several sensors, to be described hereinafter, which work in conjunction with the pitch change actuator 20 described above to control the pitch of the blades 16. Specifically, the pitch control system 203 depicted in FIG. 9a includes first control means 212 for controlling the blade pitch of the blades 16 in response to an external position control signal 210 supplied to the controller 118. The first control means 212 are normally utilized only during non-rotating operation of the turbine, but are also capable of controlling blade pitch during operation of the turbine in a rotating mode. The pitch control system of FIG. 9a also includes second control means 214 for controlling the pitch of the blades 16 only during rotating modes of operation of the vortex turbine 10 as a function of the rotational speed of the hub 12 and the power output 208 of the power generating device 202.

The first control means 212 of the pitch control system 203 includes means for sensing the blade pitch of the blades 16 with respect to the hub 12, in the form of a resolver 216 operably coupled to the motor 80, or any other functionally equivalent position sensing means including an LVDT(not shown) for sensing position of the shaft 22, or other element , etc., of the actuator 20 or the blades 16. The blade pitch is communicated to the resolver 216 via the operative connection of the blades 16 to the motor 80 through the eccentric arm means 26, the yoke 24, and the pitch change actuator 20, as described above. The resolver generates a first position signal 218 indicative of blade pitch. First summing means 220 are provided for receiving the first position signal 218 from the resolver and the second position signal 210 indicative of a desired blade pitch from an external source, such as an on-board computer of an aircraft, or from a manual input by a pilot. The summer 220 compares the first position feedback signal 218 received from the resolver 216 to the desired position signal in the form of the second position control signal 210, and generates a first blade pitch position error signal 222 having a magnitude and a polarity indicative of the difference between the actual blade pitch 16 and the desired blade pitch communicated by the second position control signal 210.

The first blade pitch position error signal 222 is received by a first position control circuit 224. The first position control circuit 224 is comprised of a first comparator 226 and first switching means 228. The comparator receives the first blade pitch position error signal 222 and compares that signal to a predetermined first threshold value of blade pitch error. For the exemplary embodiment, it is contemplated that a blade pitch error signal of between about plus or minus 0.20 to about plus or minus 5° might be utilized. If the position error signal 222 is less than the predetermined first threshold value, i.e. within the tolerance deadband created by the first threshold value, the comparator inhibits the signal. If the position error signal exceeds the threshold value, however, the comparator allows the blade pitch error signal to pass to the first switching means 228. When the first switching means 228 receives the position error signal 222, it generates a first pitch change signal 230 which is communicated to the motor 80, via an operating mode selection switch circuit 232 and a motor drive circuit 234, to cause the motor 80 to drive the blades 16 in an appropriate direction about the blade pitch axis 18 toward the desired blade pitch. Rotation of the blades 16 about the blade pitch axis 18 is detected by the resolver 216 and fed back to the first summing means 220 in the form of the first position signal 218. When the blades 16 have rotated to a blade pitch sufficiently close to the desired pitch that the first blade pitch position error signal 222 is reduced below the predetermined first threshold value, the first comparator 226 will inhibit the first blade pitch position error signal 222, thereby cutting off the first pitch change signal 230 to the motor 80. The blades 16 will then remain in the last commanded position by virtue of the non-backdriving nature of the acme screw of the pitch change actuator 20 depicted in the Figures.

Those having skill in the art will recognize that the first control means 212 of the pitch control system 203 of our invention thus provides an extremely straightforward means for controlling the pitch of the blades 16 of the air driven turbine 10 during either a rotating or non-rotating mode of operation of the turbine 10 in response to a position control signal 210. Because the pitch change actuator 20 of our invention is both non-backdrivable and has an inherently high damping coefficient, the first control means 212 of the controller 118 of our invention can be accomplished with a simple on-off - commonly known as a "bang-bang" type switching circuit, without resorting to a more complex circuit including proportional, integral, or derivative, functions as might otherwise be required to provide the non-backdriving and high damping coefficient features that are inherently provided by the non-backdrivable pitch change actuator 20 of our invention.

The second control means 214 of the pitch control system 203 includes means 236 for sensing the rotational speed of the hub 12 about the axis of rotation 14 and providing first speed signals 238 indicative of that rotational speed. The means for sensing rotational speed 236 may be provided in the form of a magnetic speed sensor 236, or other device providing a similar function, operably connected between the support structure 60 and the hub 12. The first speed signals 238 are converted to a voltage signal by a frequency-to-voltage converter 240, and supplied as a feedback signal 239 to a second summing means 242 of the second control means 214. The second summing means 242 also receives a second speed signal 244, indicative of a desired rotational speed of the hub 12, from a source of second speed signals in the form of conversion circuit means 250. The conversion circuit means 250 receives an output power signal 252 from a current transformer 248 or similar device operably connected to sense the power output 208 of the power generating device 202, and calculates the desired second speed signal 244, as a function of the output power 208, for controlling the output power 208 produced by the power generating device.

The second summing means 242 further receives an acceleration feedback signal 254 from a means 241 for taking the derivative of the first speed signals 238. While this acceleration feedback might not be required in all embodiments of our invention, we consider it to be highly desirable in a pitch control system 203 for an air driven turbine 10 to compensate for the rotational inertia of the turbine hub and blades 12,16 during the rotating mode of operation.

The second summing means 242 generates a second blade pitch error signal 258 that is communicated to a second blade pitch position control circuit 260. The second blade pitch position control circuit 260 includes a second comparator 262 and second switching means 264 which function identically with the first blade pitch position control circuit 224 to produce a second pitch change signal 266 of appropriate polarity which, when communicated via the operating mode selection switch 232 and motor drive 234 to the motor 80, causes the pitch change actuator means 20 to drive the blades 16 in the appropriate direction about the blade pitch axis 18 to reduce the second blade pitch error signal 258 below a predetermined second threshold value, which may be the same as or different from the first threshold value of the first control means 212 described above. When the blades 16 have rotated to a new blade pitch corresponding to a second blade pitch error signal 258 less than the threshold value, the second comparator 262 will inhibit the second blade pitch error signal 258 in the same manner as previously described with regard to the first blade pitch error signal 222 and first comparator 226, thereby preventing the motor 80 from further driving the blades 16.

Those having skill in the art will readily recognize that our invention provides a straightforward means for automatically controlling blade pitch in a rotating bladed device, such as the air driven turbine illustrated in the figures. It will be further recognized that by providing means for controlling rotational speed as a function output power, the problem of "droop" in a parameter of the output power experienced in prior air driven turbine driven power systems is eliminated without resorting to oversizing the air driven turbine 10, thereby providing significant benefit to the aircraft 200 by reducing the weight of the turbine.

Operation with the Vortex Turbine not Rotating

The vortex turbine 10 of our invention may be operated in a non-rotating mode to provide drag reduction for the aircraft 200 or dissipation of the vortex created by the aircraft 200. During the non-rotating mode, the pitch change actuator 20 and the pitch control systems (e.g. 11, or 203, or other embodiments) of our invention are utilized for positioning the blades 16 to a pitch angle producing maximum drag reduction and/or maximum dissipation.

To operate the vortex turbine 10 in the non-rotating mode, the locking pin 110 is inserted into the locking recess 114, to thereby prevent the hub 12 from rotating with respect to the support structure 30. The operating mode selector switch 232 is positioned as indicated schematically by solid lines in FIG. 9a to functionally configure the controller 118 into the first control means 212, for conducting the first pitch control signal 230 from the first blade pitch control circuit 224 to the motor drive 234.

A signal indicative of a desired blade pitch, in the form of the second position signal 210, is supplied to the first summing means 220 of the first control means 212 from an external source. The first summing means compares the second position signal 210 to the current position of the blade, as represented by the first position signals 218 supplied by the resolver 216, and generates a first blade pitch position error signal 222 which is supplied to the first blade pitch control circuit 224. If the first blade pitch position error signal 222 exceeds the first threshold value, the first control means generates and communicates a first pitch change signal 230 of appropriate polarity to cause the electric motor 80 of the pitch change actuator 20 to drive the blades 16 toward the desired pitch position. Specifically, the electric motor 80 drives the drive gear 82 in an appropriate direction about the drive gear axis 86. The drive gear 82 in turn drives the acme nut 84, by virtue of the gearmesh relationship between the drive gear and the driven gear portion 93 of the acme nut 84, causing the acme nut 84 to rotate about the axis of rotation 14. As the acme nut 84 rotates, the interaction of the threaded portion of the acme nut 84 with the acme screw portion 96 of the support structure 60 causes the acme nut 84 to translate along the axis of rotation 14. The acme nut 84, through the pin 100 in cooperation with the bearing carrier 102 and retaining means 106, 108, causes the shaft 22 to translate along the axis 14 in unison with the acme nut 84. The elongated slots 101 in the hub 12 about the pin 100 allow the acme nut 84 to move axially despite the fact that the hub 12 is stationary with respect to the support structure 30 in the axial direction.

In order for the pitch change system 203 to be operative in either the rotating or the non-rotating modes, the disconnect means 28 must be in the locked position 54, as shown in FIGS. 1 and 2. With the disconnect means 28 in the locked position, axial force and motion of the shaft 22 is transferred from the first detent means 34 of the shaft 22, through the detent balls 32, to the wall of the hole 38 in the yoke 24. The yoke 24 in turn transfers the axial force and motion to the eccentric arm means 26 operably connecting the yoke 24 to the blades 16.

As the blades 16 rotate toward the desired position, their pitch is continually fed back to the first summing means 220 of the first control means 212 in the form of the first position signal 218. When the blades 16 have rotated to a pitch matching the desired blade pitch closely enough for the first blade pitch error signal 222 to fall within the deadband created by the first threshold value, the first comparator 226 will inhibit the first position error signal 222 from reaching the first switching means 228, thereby causing the first pitch change signal 230 to be cut off. The blades 16 then remain in the last commanded position until the first position error signal 222 once again exceeds the first threshold value, at which time the first control means 212 will once again readjust the blade pitch, in the manner described above.

Normal Rotating Operation

With an air stream 19 flowing through the blades 16, the blades 16 will generate torque urging the hub 12 to rotate about the axis 14. As long as the locking pin 110 is engaged, as described above, the torque generated by the blades 16 is reacted through the locking pin 110 into the support structure 60, and the hub 12 is prevented from rotating.

To operate the turbine 10 in the rotating mode, the locking pin 110 is retracted, thereby allowing the hub 12 to rotate, and the operating mode selector switch 232 is positioned as indicated schematically by dashed lines in FIG. 9a to functionally configure the controller 118 into a the second control means 214, for conducting the second pitch control signal 266 from the second blade pitch control circuit 260 to the motor drive 234. The torque acting on the blades 16 then causes the hub 12 to rotate about the axis 14. Power extracted from the airstream 19 by the air driven turbine 10 is coupled to the generator 116 which converts the rotary power extracted from the airstream 19 by the turbine 10 into electrical power 205, which is supplied as output power 208 to the aircraft 200 by the converter 206.

With the locking pin 110 withdrawn, operation of the pitch change actuator 20 of the pitch control system 203 in the normal rotating operating mode is identical to that described above in relation to operation in the non-rotating mode. During normal rotating operation of the embodiment of our invention depicted in FIG. 9a, however, the pitch control system 203 is utilized to control the power output 208 of the power converting device 202 by adjusting the blade pitch to vary the rotational speed and power output of the turbine 10. Specifically, the current transformer 248 senses the power output 208 and supplies a signal indicative of the present output power 208 being produced by the power generating device 202, in the form of the output power signal 252, to the conversion circuit 250 of the second control means 214 of the controller 118. The conversion circuit 250 calculates the desired second speed signal 244, as a function of the output power signal 252, and supplies the second speed signal 252 to the second summing means 242. The second summing means 242 combines the second speed signal 252 with the first speed signal 238 from the speed sensor 236, and generates a second blade pitch error signal 258, which is supplied to the second blade pitch control circuit 260. If the second blade pitch position error signal 258 exceeds the second threshold value, the second control means 214 generates and communicates a second pitch change signal 266 of appropriate polarity to the motor 80, to cause the electric motor 80 of the pitch change actuator 20 to drive the blades 16 toward the desired pitch position corresponding to the desired speed of the turbine and the desired power output 208 of the power generating device 202.

As the blades 16 rotate toward the desired pitch position, the rotational speed of the turbine 10 is continually fed back to the second summing means 260 of the second control means 214 in the form of the first speed signal 238. When the blades 16 have rotated to a pitch at which the desired speed of the turbine 10 matches the desired speed closely enough for the second blade pitch error signal 258 to fall within the deadband created by the second threshold signal, the second comparator 262 will inhibit the second position error signal 258 from reaching the second switching means 264, thereby causing the second pitch change signal 266 to be cut off. The blades then remain in the last commanded position until the second position error signal 258 once again exceeds the second threshold value, at which time the second control means 214 will once again readjust the blade pitch to control power output 208, in the manner described above.

As the turbine 10 changes speed in response to commands from the second control means 214, the second summing device 242 receives an acceleration feedback signal 254 from the means 240 for taking the derivative of the first speed signal 238. The second control means 214 uses this feedback 254 in the manner described above to automatically trim the rate at which blade pitch would otherwise be adjusted by the pitch control system 203 to compensate for the rotational inertia of the turbine 10, and thereby facilitate stable control of blade pitch.

Those having skill in the art will recognize, therefore, that our invention provides a convenient and straightforward means of controlling blade pitch in the rotating mode to alternatively or simultaneously optimize power extraction, drag reduction, and/or vortex dissipation.

Those having skill in the art will also readily recognize that in the aircraft 200 depicted in FIG. 9a, both the output frequency and the power output 208 of the power generating device 206 can be controlled independently of one another. This capability allows the droop which plagued some prior air driven power generation systems to be significantly reduced or eliminated. Specifically, because output frequency is controlled by the converter 206, changes in turbine speed have no effect on the frequency of the output power. Because the frequency is independently controlled, the control system 203 can adjust turbine speed to achieve a desired output power 208 level, and thus prevent droop as the demand for output power 208 increases. Our invention thus allows a degree of control and utility not found in prior air driven power systems.

Overspeed Protection

Should the turbine 10 exceed the predetermined disconnect speed, centrifugally generated forces acting on the flyballs 48 of the governor means 46 will cause the flyballs 48 to move radially outward in the ball-ramp pockets 58, as indicated in FIGS. 3 and 4. As the flyballs 48 move radially outward, the shape of the ball-ramp pockets 58 causes the locking piston 36 to move axially from the locked position 54, as shown in FIGS. 1 and 2, to the unlocked position 56 as shown in FIGS. 3 and 4. With the locking piston 36 in the unlocked position 56, the second detent means 42 of the locking piston 36 are aligned with the through-holes 38 in the yoke 24 in such a manner that the detent balls 32 are thrown radially outward, by centrifugally generated forces, into the second detent means 42, thereby completely disengaging the detent balls 32 from the shaft 22 and decoupling the shaft 22 from the yoke 24. The return spring 30 then forces the yoke 24 to move axially, to the left as depicted, driving the blades to the failsafe position depicted in FIGS. 1 and 2.

Once the yoke 24 is decoupled from the shaft 22 by operation of the disconnect means 42, the shaft 22 is free to move in an axial direction independently from the yoke 24, thus rendering the pitch change system 203 inoperative until the overspeed protection device 28 is re-set to the locked position 54. It is contemplated that the overspeed protection device would be re-set during overhaul of the air driven turbine 10, subsequent to an overspeed condition, by repositioning the components of the overspeed protection device 28 in the locked position 56, as illustrated in FIGS. 1 and 2. It should be noted that with the overspeed protection device 28 of our invention, there are no shear pins, etc., to replace in order to re-set the device, thereby greatly facilitating overhaul operations. The disconnect speed at which the overspeed device is triggered may be predetermined by judicious selection and design of the governor spring 44, and other features of the overspeed device, such as the flyballs 48 and the shape of the ball ramp pockets 58.

Alternate Operating Modes

Although the first control means 214 of our invention will typically be utilized only when the turbine 10 is operated in the non-rotating mode, they may also be selectively used to control blade pitch in a rotating mode by switching the operating mode selection switch 232 from the position indicated in solid lines to the position indicated in dashed lines. With the operating mode selection switch thus positioned, the first control means 212 may be used as a back-up control means for controlling blade pitch in the event that the second control means 214 becomes inoperative.

In another alternative operating scenario, it may be desirable to have the vortex turbine 10 locked in the non-rotating mode during normal take-off and flight operations for drag reduction and vortex dissipation. In the event of an in-flight emergency, the locking pin 110 would be retracted to allow the vortex turbine to drive the generator 116 for supplying emergency electrical power to the aircraft 200.

The blades 16 of an air driven turbine according to our invention may be attached to the hub 12 by any type of bearing arrangement utilized in the past for attaching variable pitch blades to a hub. In a preferred embodiment of our invention, however, the blades 16 are attached to the hub 12 by radial bearings 150 in combination with specially configured ball ramp thrust bearings 130, as shown in FIGS. 1–3 and 7–8. The ball ramp bearings 130 are configured to provide forces which aid the pitch change mechanism 11 and overspeed protection device 28 in performing their respective functions. The use of similar rolling element/ramp type devices for attaching propeller blades to a hub is illustrated by U.S. Pat. No. 4,948,339 to Adamson. Such devices have not previously been utilized in RATs or vortex turbines, however, and provide particular advantage when coupled with the pitch control mechanism 11 of our invention.

For any type of bladed device rotating about an axis in an airstream, the blades generate centrifugal forces on the hub, and aerodynamic and centrifugal moments acting on the blades about the blade pitch axis. The centrifugal forces generated by the blades 16 are normally reacted by a thrust bearing into the hub 12, while the aerodynamic and centrifugal moments on the blades 16 must be reacted by the pitch change mechanism and/or an overspeed protection device 28. Because both the centrifugal force and the centrifugal moment are a function of the speed squared, they can be quite large in a bladed device rotating at high speed. For an air driven turbine such as a RAT, which typically rotates at several thousand rpm, as opposed to only several hundred rpm for a typical propeller, these centrifugally generated forces may exceed 20,000 pounds for each blade.

A ball ramp bearing 130, of the type depicted in the exemplary embodiment, performs two functions. The first function is to operate essentially as a standard thrust bearing to provide a means for reacting the centrifugally generated forces Fcf acting on the blades 16 into the hub 12. The second function performed by the ball ramp bearing 130 is conversion of a portion of the centrifugally generated force Fcf into a torque for counter-balancing the centrifugal moment generated by the blade.

The axial force Fact which must be provided by the pitch change mechanism 11 to control the pitch of the blades 16 in an air driven turbine according to our invention may be calculated using the following formula:

$$Fact \geq \frac{(Tbr - Tctm - Tatm)}{R \times \cos\theta_y} XN$$

Wherein Tbr represents the counteracting torque generated by the ball ramp bearing; Tctm represents the centrifugal moment generated by the blade; Tatm represents the aerodynamic moment generated by the blade; R is the radius from the blade pitch axis 18 to the centerline of pin 124; and N is equal to the number of blades 16. As indicated schematic in FIGS. 6 and 7, and as will be readily recognized by those having skill in the art, the aerodynamic moment Tatm is respectively quite small in comparison to the centrifugal moment Tctm and the bearing torque Tbr for a bladed device rotating at high speed, such as the vortex turbine 10 of the exemplary embodiment, and can thus be essentially ignored in the design of the ball ramp bearing 130.

Figure 6:
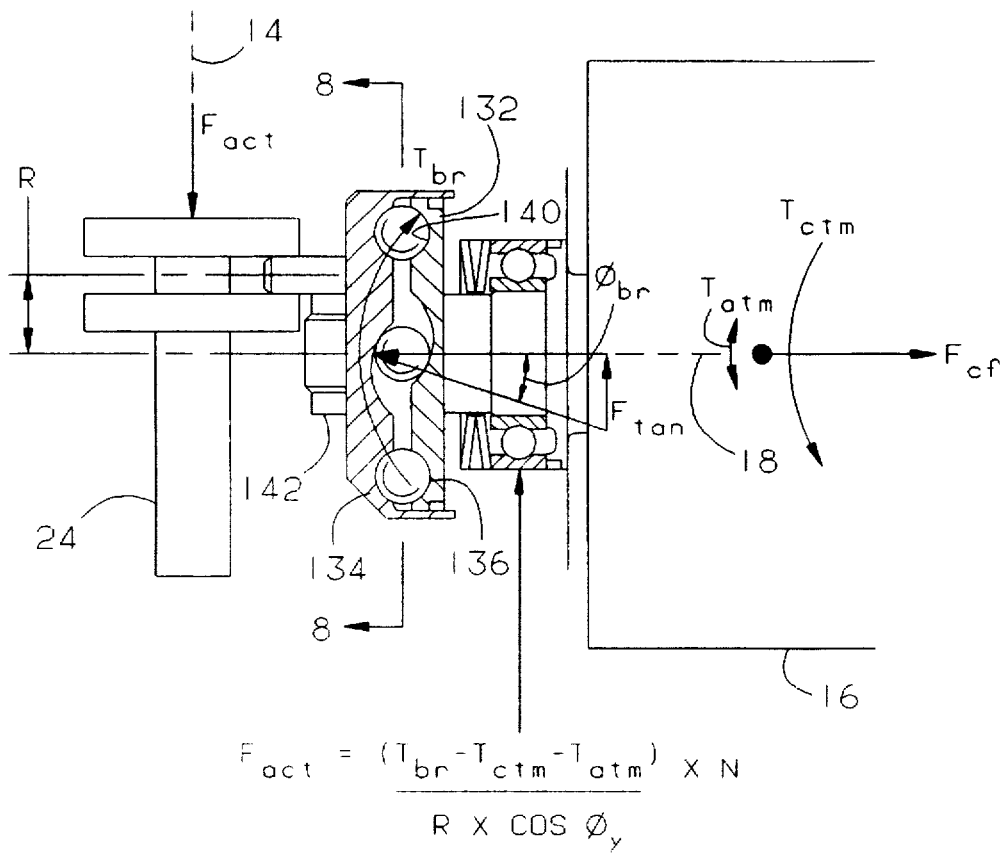
FIGS. 6-8 illustrate various features and operational modes of a ball ramp bearing utilized for attaching the blades to the hub in the vortex turbine of FIGS. 1-3.
Figure 8:
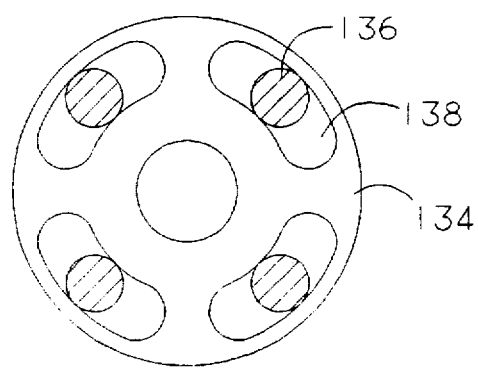
Figure 7:
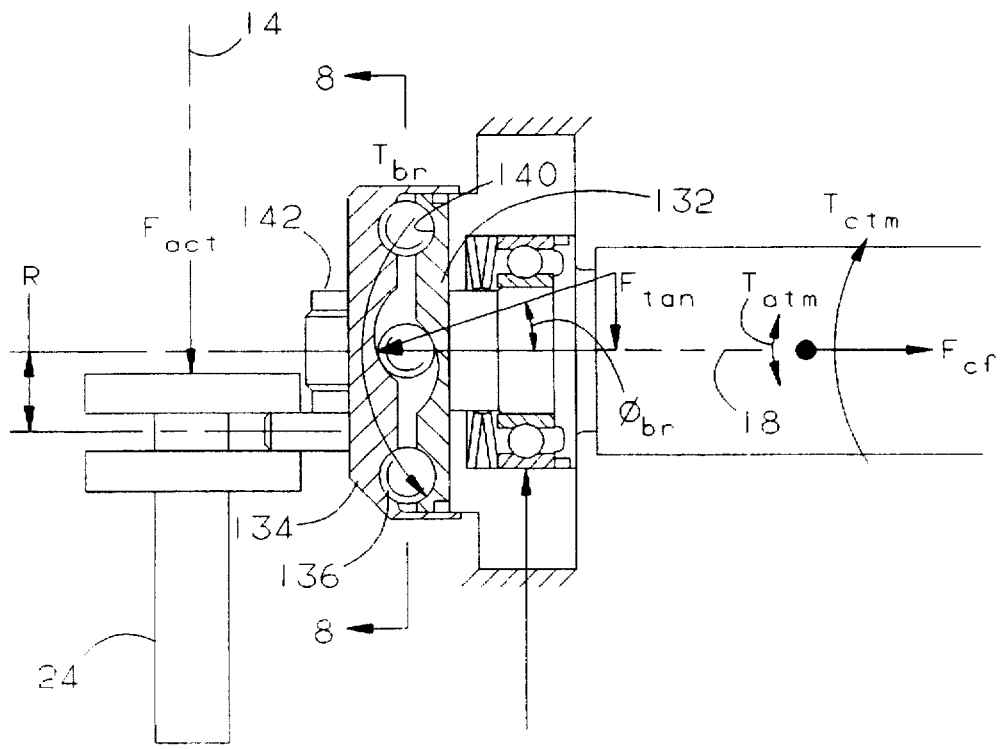

As best seen in FIGS. 6 through 8, the ball ramp bearing 130 includes a radially outer race 132, a radially inner race 134, both respectively including inclined ball ramps 138, 140, for a receipt therein of a plurality of balls 136. The outer race 132 is integrally joined to the hub 12. The root of the blade 16 passes through the outer race in a manner to be rotatable and axially movable along the blade pitch axis 18. The inner race 134 is integrally joined to the root of the blade 16 for movement axially and rotatably therewith, with respect to the blade pitch axis 18. A set of bellville springs 150 is functionally disposed between the hub 12 and the blade 16 to apply a preloading force across the balls 136 which pulls the inner race 134 toward the outer race 132.

As the turbine 10 rotates, the blades 16 generate the centrifugal force Fcf which is reacted across the ballramp bearing 130. In response to the centrifugal force Fcf, the ball ramps 138, 140 will cause the inner race 134 and blade 16 to rotate a limited distance about the blade pitch axis 18 with respect to the outer race 132. The bellville springs 150 allow a limited amount of radially inward movement of the blade 16 as the balls 136 ride up the ball ramp means 138, 140. As the balls 136 ride up the ramps 138, 140 a wedging action between the balls 136 and the ramps 138, 140 creates the force Ftan and a bearing torque Tbr which counteracts the centrifugal moment Tctm of the blade.

The amount of axial and rotational movement of the inner race 134 with respect to the outer race 132, as well as the amount of counteracting bearing torque Tbr produced at a given speed is a function of the design of the balls 136 and the ball ramp means 138, 140. As illustrated in FIGS. 6 and 7, and by deduction from the formula above, it will be seen that the various features of the ball ramp bearing 130 may be designed in such a manner that the centrifugal force Fcf acting on the ball ramp bearing 130 will produce a bearing torque Tbr which is essentially equal but oppositely directed about the blade pitch axis 18 to the centrifugal moment Tctm. The bearing torque Tbr and the centrifugal moment Tctm will automatically counterbalance over the entire rotational speed range because both the centrifugal force Fcf which generates the bearing torque Tbr and the centrifugal moment Tctm are functions of the speed squared. The resulting axial force Fact on the pitch change mechanism 11 is thus reduced to a relatively low value needed to overcome the relatively small aerodynamic moment and any small difference between the counterbalanced torque provided by the bearing Tbr and the centrifugal moment Tctm generated by the blades 16.

By virtue of the reduction in axial force required of the actuator Fact, the various components of the pitch change mechanism 11 and the overspeed protection device 28 can be significantly reduced in size thus resulting in lower weight in volume. Lower forces also reduce the power needed to change blade pitch angle, thereby allowing the use of smaller actuators and improved response time.

The ball ramp 138, 140 of the ball ramp bearing 130 can also be designed to have a variable ramp angle θ br to proportionally counterbalance the increased centrifugal moment Tctm at large blade pitch angles. The ball ramp bearing 130 can be configured to further assist the overspeed protection device 28 in the event of a failure of the pitch change mechanism, by selecting ball ramp angles θ br that will create a net torque which will always drive the blades 16 toward the fail safe position. More specifically, to provide such overspeed protection, the ball ramp angles θ br are selected such that the ball ramp moment Tbr will always be larger than the centrifugal moment Tctm, resulting in a net moment tending to urge the blades to move toward a coarse pitch or failsafe position. Such advantageous design and use of the ball ramp angle θ br thus allows the return spring 30 in particular, and the other components of the overspeed protection device 28 to be made generally smaller, lighter, and more compact then they would otherwise have to be.

From the foregoing descriptions, those having skill in the art will readily recognize that our invention has great utility in air driven turbines or other types of bladed devices having one or more variable pitch blades extending from a hub. In particular, it will be recognized that our invention finds particular utility in air driven turbines such as RATs or vortex turbines of the type utilized for: extracting power from an air stream passing by an aircraft; reducing drag on the aircraft; or dissipating a vortex generated by an aircraft in flight. The pitch control system of our invention may be utilized with such devices in either a rotating or a non-rotating mode of operation, or with such devices which must be capable of transitioning between a rotating and non-rotating mode and having pitch control available in either mode. It will further be appreciated that the overspeed protection mechanism of our invention functions independently from the pitch control function, thereby providing an additional measure of safety in comparison to prior mechanisms for controlling variable pitch blades in which the overspeed protection mechanism was not independent of the pitch control function. It will be still further appreciated that through the practice of our invention, an air driven turbine with adjustable pitch blades and overspeed protection may be readily produced in a straightforward manner resulting in low cost and weight, and enhanced reliability.

We wish to emphasize that although we have described our invention herein with respect to several specific embodiments thereof, many other embodiments and applications of our invention are possible within the scope of our invention as described in the appended claims. For example, our invention is applicable to bladed devices having more or less blades then the two bladed version depicted in the figures herein. Our invention is also applicable to variable pitch devices utilizing pitch change actuators of a type different from the electric motor driven acme screw arrangement depicted in the drawings. For instance, other types of electric, hydraulic, or pneumatically powered devices, etc., could also be utilized. Furthermore, virtually any other type of drive mechanism, i.e. different from the acme screw depicted, capable of converting rotary motion into axially motion of the shaft 22, such as a recirculating ball screw, could also be utilized. It is anticipated, however, that non-backdrivable drive arrangements will generally be preferable due to the inherent position holding and high damping characteristics such non-backdrivable arrangements provide. The overspeed protection device of our invention is also applicable in rotating devices using mechanical flyball governor and spring arrangements of the type previously used in ram air turbines.

Figure 9B:
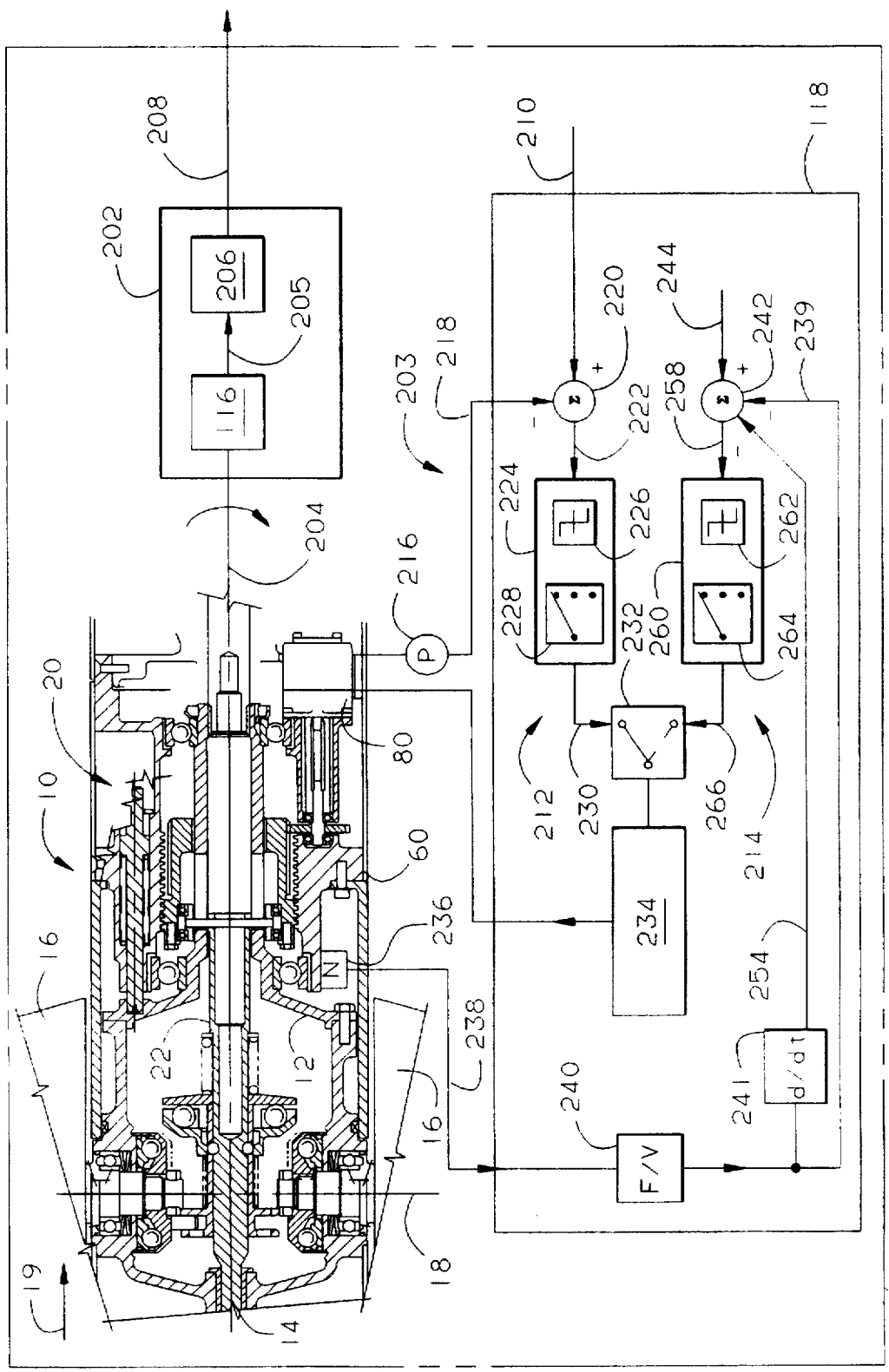
Figure 9C:
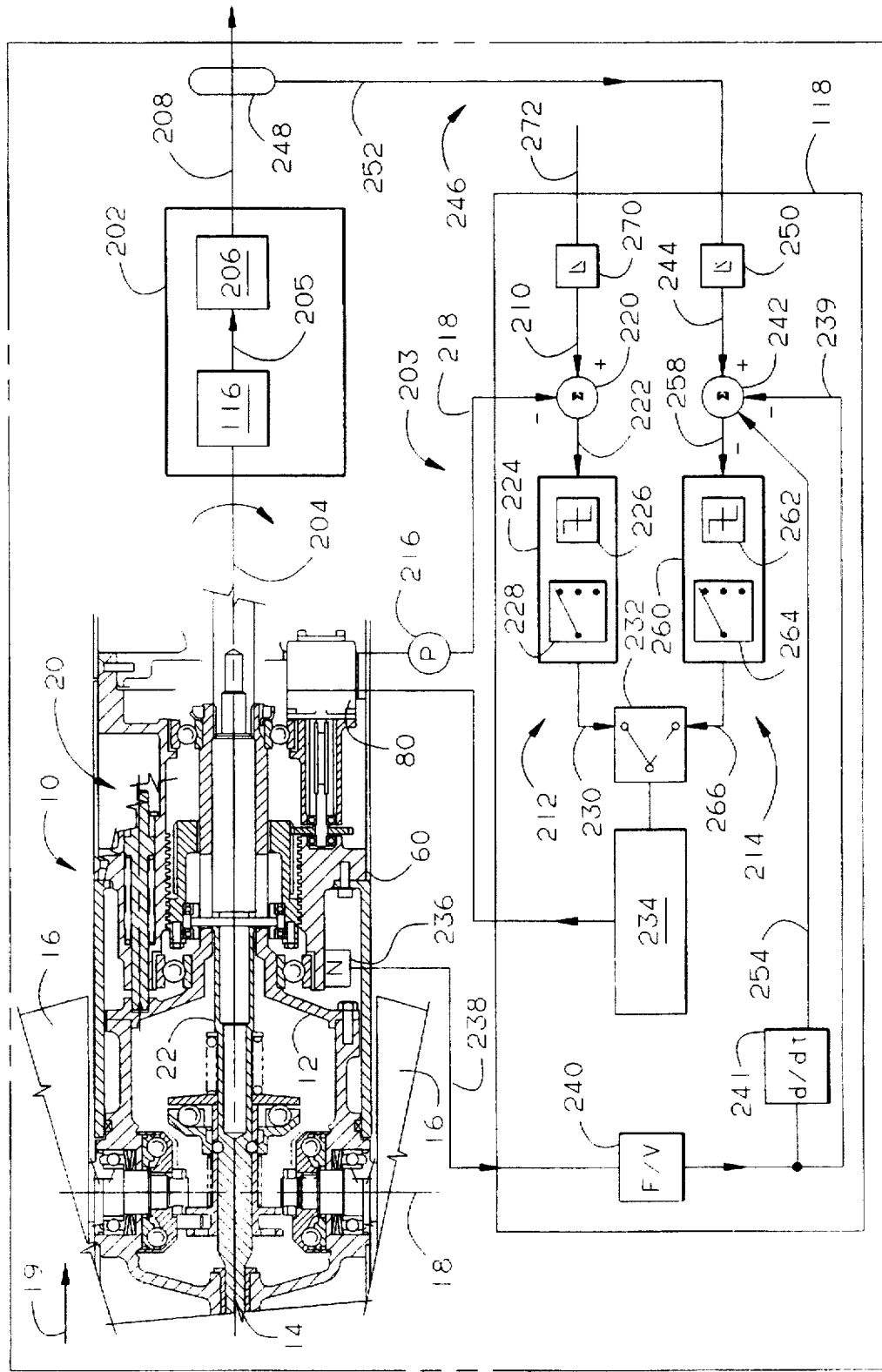

In summary, we particularly wish to emphasize that many of the details of the various control and actuation features depicted and described herein are simply examples of a virtually unlimited variety of similar features or devices which may be used with facility in practicing our invention. Furthermore, those having skill in the art will readily recognize that some or all of the features and functions of our invention may be utilized independently, or in combinations other than those specifically described or depicted herein without exceeding the scope of our invention. For example, FIG. 9b depicts an embodiment of our invention in which the converter 250 and the current transformer 248 are eliminated, with the second speed signal 244 being provided by an external source (not shown). Alternatively, the converter 250 can be programmed to provide a constant speed reference and the current transformer 248 eliminated in applications where it is desired to control turbine speed at a constant value independent of the power output 208 of the power generating device 202. In yet another embodiment, as shown in FIG. 9c, a position converter 270 for calculating the second position signal 210 in response to an input parameter signal 272, such as airspeed of the aircraft 200, can be added to the first control means 212, between the first summing means 220 and the external source (not shown) of the input parameter signal 272. It is understood, therefore, that the spirit and scope of the appended claims should not be limited to the specific embodiments described and depicted herein.

We claim:

1. A blade pitch control system for a bladed device having a hub defining an axis of said hub and a movable blade extending from said hub along a blade pitch axis passing transversely through the hub, said blade being attached to said hub for rotation of the blade about said blade pitch axis through a range of blade pitches of said blade with respect to said axis of said hub, said blade pitch control system comprising:

a) pitch change actuator means operably connected between said hub and said blade for changing said blade pitch of said blade with respect to said hub, said pitch change actuator means including:
   (1) a motor;
   (2) non-backdrivable drive means having an input connected to said motor to be driven thereby and an output connected to said blade for changing the pitch of said blade when said drive means is driven by said motor;

b) means for sensing a blade pitch of said blade with respect to said hub and providing first position signals indicative of that blade pitch;

c) a source of second position signals indicating a desired blade pitch;

d) means for creating a blade pitch position error signal from said first and second blade pitch position signals; and e) means for applying pitch control signals to said motor which are a function of said blade pitch position error signal, wherein said means for applying pitch control signals includes:
   (1) comparator means for comparing said blade pitch position error signal to a predetermined threshold value of said blade pitch position error signal;
   (2) motor drive means operably connected to said motor for supplying said control signals thereto; and
   (3) switching means operably connected between said comparator and said motor drive means for enabling said motor drive means to supply said pitch control signals to said motor when said blade pitch position error signal exceeds said threshold value, and for inhibiting said motor drive means from supplying said pitch control signals to said motor when said blade pitch position error signal does not exceed said threshold value.

2. A blade pitch control system for a bladed device having a hub that is rotatable about an axis of rotation of said hub and a movable blade extending from said hub along a blade pitch axis passing transversely through the hub, said blade being attached to said hub for rotation of the blade about said blade pitch axis through a range of blade pitches of said blade with respect to said axis of rotation of said hub, said blade pitch control system comprising:

a) pitch change actuator means operably connected between said hub and said blade for changing said blade pitch of said blade with respect to said hub, said pitch change actuator means including;
   (1) a motor;
   (2) non-backdrivable drive means having an input connected to said motor to be driven thereby and an output connected to said blade for changing the pitch of said blade when said drive means is driven by said motor;
b) means for sensing a rotational speed of said hub about said axis of rotation and providing first speed signals indicative of that rotational speed;
c) a source of second speed signals indicating a desired rotational speed of said hub;
d) means for taking a derivative of said first speed signals to determine actual acceleration of the hub and generating an acceleration signal indicative of that actual acceleration;
e) means for creating a blade pitch position error signal from said first and second speed signals and said acceleration signal; and
f) means for applying pitch control signals to said motor which are a function of said blade pitch position error signal.

3. The blade pitch control system of claim 2 wherein said means for applying pitch control signals includes:
   (1) comparator means for comparing said blade pitch position error signal to a predetermined threshold value of said blade pitch position error signal;
   (2) motor drive means operably connected to said motor for supplying said control signals thereto; and
   (3) switching means operably connected between said comparator and said motor drive means for enabling said motor drive means to supply said pitch control signals to said motor when said blade pitch position error signal exceeds said threshold value, and for inhibiting said motor drive means from supplying said pitch control signals to said motor when said blade pitch position error signal does not exceed said threshold value.

4. The blade pitch control system of claim 2 further including:
   g) means for sensing a blade pitch of said blade with respect to said hub and providing first position signals indicative of that blade pitch;
   h) a source of second position signals indicating a desired blade pitch;
   i) means for creating a blade pitch position error signal from said first and second blade pitch position signals; and
   j) means for applying pitch control signals to said motor which are a function of said blade pitch position error signal determined from said first and second blade pitch position signals.

5. The blade pitch control system of claim 4 wherein said means for applying pitch control signals includes:
   (1) comparator means for comparing said blade pitch position error signal to a predetermined threshold value of said blade pitch position error signal;
   (2) motor drive means operably connected to said motor for supplying said control signals thereto; and
   (3) switching means operably connected between said comparator and said motor drive means for enabling said motor drive means to supply said pitch control signals to said motor when said blade pitch position error signal exceeds said threshold value, and for inhibiting said motor drive means from supplying said pitch control signals to said motor when said blade pitch position error signal does not exceed said threshold value.

6. A blade pitch control system for a blade device having a hub that is rotatable about an axis of rotation of said hub and a movable extending from said hub along a blade pitch axis passing transversely through the hub, said blade being attached to said hub for rotation of the blade about said blade pitch axis through a range of blade pitches of said blade with respect to said axis of rotation of said hub, said blade pitch control system comprising:

a) pitch change actuator means operably connected between said hub and said blade for changing said blade pitch of said blade with respect to said hub, said pitch change actuator means including:
   (1) a motor;
   (2) non-back-drivable drive means having an input connected to said motor to be driven thereby and an output connected to said blade for changing the pitch of said blade when said drive means is driven by said motor;
b) first control means for controlling the pitch of said blades when said bladed device is not rotating about said axis of rotation, wherein said first control means includes:
   (1) means for sensing a blade pitch of said blade with respect to said hub and providing first position signals indicative of that blade pitch;
   (2) a source of second position signals indicating a desired blade pitch;
   (3) means for creating a blade pitch position error signal from said first and second blade pitch position signals; and
   (4) means for applying pitch control signals to said motor which are a function of said blade pitch position error signal; and
c) second control means for controlling the blade pitch of said blades when said bladed device is rotating about said axis of rotation.

7. The blade pitch control system of claim 6 wherein said means for applying pitch control signals includes:
   A) comparator means for comparing said blade pitch position error signal to a predetermined threshold value of said blade pitch position error signal;
   B) motor drive means operably connected to said motor for supplying said control signals thereto; and
   C) switching means operably connected between said comparator and said motor drive means for enabling said motor drive means to supply said pitch control signals to said motor when said blade pitch position error signal exceeds said threshold value, and for inhibiting said motor drive means from supplying said pitch control signals to said motor when said blade pitch position error signal does not exceed said threshold value.

8. A blade pitch control system for a bladed device having a hub that is rotatable about an axis of rotation of said hub and a movable blade extending from said hub along a blade pitch axis passing transversely through the hub, said blade being attached to said hub for rotation of the blade about said blade pitch axis through a range of blade pitches of said blade with respect to said axis of rotation of said hub, said blade pitch control system comprising:

a) pitch change actuator means operably connected between said hub and said blade for changing said blade pitch of said blade with respect to said hub, said pitch change actuator means including:
 (1) a motor;
 (2) non-back-drivable drive means having an input connected to said motor to be driven thereby and an output connnected to said blade for changing the pitch of said blade when said drive means is driven by said motor;

b) first control means for controlling the pitch of said blades when said bladed device is not rotating about said axis of rotation; and c) second control means for controlling the blade pitch of said blades when said bladed device is rotating about said axis of rotation, wherein said second control means includes:
 (1) means for sensing a rotational speed of said hub about said axis of rotation and providing first speed signals indicative of that rotational speed;
 (2) a source of second speed signals indicating a desired rotational speed of said hub;
 (3) means for taking a derivative of said first speed signals to determine actual acceleration of the hub and generating an acceleration signal indicative of that actual acceleration;
 (4) means for creating a blade pitch position error signal from said first and second speed signals and said acceleration signal; and
 (5) means for applying pitch control signals to said motor which are a function of said blade pitch position error signal.

9. The blade pitch control system of claim 8 wherein said means for applying pitch control signals includes:

A) comparator means for comparing said blade pitch position error signal to a predetermined threshold value of said blade pitch position error signal;

B) motor drive means operably connected to said motor for supplying said control signals thereto; and C) switching means operably connected between said comparator and said motor drive means for enabling said motor drive means to supply said pitch control signals to said motor when said blade pitch position error signal exceeds said threshold value, and for inhibiting said motor drive means from supplying said pitch control signals to said motor when said blade pitch position error signal does not exceed said threshold value.

10. An aircraft including:

a) an air driven turbine attached to said aircraft and disposed to extend into an airstream flowing about said aircraft;
 said turbine including a hub rotatable about an axis of rotation of said hub and a movable blade extending from said hub along a blade pitch axis passing transversely through the hub;
 said blade being attached to said hub for rotation of the blade about said blade pitch axis through a range of blade pitches of said blade with respect to said axis of rotation of said hub;

b) a power generating device operably connected to said hub to be driven thereby for producing a power output of said power generating device; and c) a pitch control system for controlling the blade pitch as a fuction of said power output of said power generating device, wherein said pitch control system includes:
 (1) means for sensing a rotational speed of said hub about said axis of rotation and providing first speed signals indicative of that rotational speed;
 (2) means for sensing said power output and providing second speed signals indicating a desired power output of said power generating device; and
 (3) means for controlling said power output of said power generating device by controlling the pitch of blade as a function of said first and second speed signals.

11. The aircraft of claim 10 wherein said pitch control system includes:
 (1) means for sensing said power output of said generating device and providing a first power output signal indicative of that power output;
 (2) a source of second power output signals indicating a desired power output of said power generating device; and
 (3) means for controlling said power output of said power generating device by controlling the pitch of the blade as a function of said first and second power output signals.

12. The aircraft of claim 10 wherein said pitch control system further includes:

a) pitch change actuator means operably connected between said hub and said blade for changing said blade pitch of said blade with respect to said hub, said pitch change actuator means including;
 (1) a motor;
 (2) non-backdrivable drive means having an input connected to said motor to be driven thereby and an output connected to said blade for changing the pitch of said blade when said drive means is driven by said motor;

b) means for taking a derivative of said first speed signals to determine actual acceleration of the hub and generating an acceleration signal indicative of that actual acceleration;

c) means for creating a blade pitch position error signal from said first and second speed signals and said acceleration signal; and d) means for applying pitch control signals to said motor which are a function of said blade pitch position error signal.

13. The aircraft of claim 12 wherein said means for applying pitch control signals includes:
 (1) comparator means for comparing said blade pitch position error signal to a predetermined threshold value of said blade pitch position error signal;
 (2) motor drive means operably connected to said motor for supplying said control signals thereto; and
 (3) switching means operably connected between said comparator and said motor drive means for enabling said motor drive means to supply said pitch control signals to said motor when said blade pitch position error signal exceeds said threshold value and for inhibiting said motor drive means from supplying said pitch control signals to said motor when said blade pitch position error signal does not exceed said threshold value.

14. The aircraft of claim 12 including means for controlling the blade pitch when the hub is not rotating about the axis of rotation comprising:

f) means for sensing a blade pitch of said blade with respect to said hub and providing first position signals indicative of that blade pitch;

g) a source of second position signals indicating a desired blade pitch;

h) means for creating a blade pitch position error signal from said first and second blade pitch position signals; and i) means for applying pitch control signals to said motor which are a function of said blade pitch position error signal determined from said first and second blade pitch position signals.

15. The aircraft of claim 14 wherein said means for applying pitch control signals includes:

(1) comparator means for comparing said blade pitch position error signal to a predetermined threshold value of said blade pitch position error signal;

(2) motor drive means operably connected to said motor for supplying said control signals thereto; and (3) switching means operably connected between said comparator and said motor drive means for enabling said motor drive means to supply said pitch control signals to said motor when said blade pitch position error signal exceeds said threshold value, and for inhibiting said motor drive means from supplying said pitch control signals to said motor when said blade pitch position error signal does not exceed said threshold value.

16. The aircraft of claim 10 wherein said pitch control system includes means for controlling the pitch of said blades when said hub is not rotating about said axis of rotation.

17. An aircraft including:

an air driven turbine attached to said aircraft and disposed to extend into an airstream flowing about said aircraft;

said turbine including a hub rotatable about an axis of rotation of said hub and a movable blade extending from said hub along a blade pitch axis passing transversely through the hub;

said blade being attached to said hub for rotation of the blade about said blade pitch axis through a range of blade pitches of said blade with respect to said axis of rotation of said hub;

b) a power generating device operably connected to said hub to be driven thereby for producing a power output of said power generating device; and c) a pitch control system for controlling the blade pitch as a fuction of said power output of said power generating device, wherein said pitch control system includes:

(1) means for controlling the pitch of said blades when said hub is not rotating about said axis of rotation, wherein said means for controlling the pitch of said hub is not rotating about said axis of rotation includes:

a) means for sensing a blade pitch of said blade with respect to said hub and providing first position signals indicative of that blade pitch;

b) a source of second position signals indicating a desired blade pitch;

c) means for controlling said blade pitch as a function of said first and second position signals.

18. An aircraft including:

an air driven turbine attached to said aircraft and disposed to extend into an airstream flowing about said aircraft;

said turbine including a hub rotatable about an axis of rotation of said hub and a movable blade extending from said hub along a blade pitch axis passing transversely through the hub;

said blade being attached to said hub for rotation of the blade about said blade pitch axis through a range of blade pitches of said blade with respect to said axis of rotation of said hub;

b) a power generating device operably connected to said hub to be driven thereby for producing a power output of said power generating device; and c) a pitch control system for contolling the blade pitch as a function of said power output of said power generating device, wherein said pitch control system includes:

(1) means for controlling the pitch of said blade when said hub is not rotating about said axis of rotation, wherein said means for controlling the pitch of said blades when said hub is not rotating about said axis of rotation includes:

a) pitch change actuator means operably connected between said hub and said blade for changing said blade pitch of said blade with respect to said hub, said pitch change actuator means including:

(1) a motor;

(2) nonbackdrivable drive means having an input connected to said motor to be driven thereby and an output connected to said blade for changing the pitch of said blade when said drive means is driven by said motor;

b) means for sensing a blade pitch of said blade with respect to said hub and providing first position signals indicative of that blade pitch;

c) a source of second position signals indicating a desired blade pitch;

d) means for creating a blade pitch position error signal from said first and second blade pitch position signals; and e) means for applying pitch control signals to said motor which are a function of said blade pitch position error signal.

19. The aircraft of claim 18 wherein said means for applying pitch control signals includes:

(1) comparator means for comparing said blade pitch position error signal to a predetermined threshold value of said blade pitch position error signal;

(2) motor drive means operably connected to said motor for supplying said control signals thereto; and (3) switching means operably connected between said comparator and said motor drive means for enabling said motor drive means to supply said pitch control signals to said motor when said blade pitch position error signal exceeds said threshold value, and for inhibiting said motor drive means from supplying said pitch control signals to said motor when said blade pitch position error signal does not exceed said threshold value.

* * * * *